(12) United States Patent
Ohtsu (10) Patent No.: US 7,193,840 B2
(45) Date of Patent: Mar. 20, 2007

(54) SOLID ELECTROLYTIC CAPACITOR

(75) Inventor: Yasuko Ohtsu, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/390,191

(22) Filed: Mar. 28, 2006

(65) Prior Publication Data

US 2006/0221557 A1   Oct. 5, 2006

(30) Foreign Application Priority Data

| Mar. 29, 2005 | (JP) | ............................. 2005-094587 |
| Mar. 29, 2005 | (JP) | ............................. 2005-094588 |
| Mar. 29, 2005 | (JP) | ............................. 2005-094589 |
| Mar. 29, 2005 | (JP) | ............................. 2005-094590 |

(51) Int. Cl.
*H01G 5/38* (2006.01)
*H01G 2/10* (2006.01)

(52) U.S. Cl. ...................... 361/541; 361/535

(58) Field of Classification Search ........ 361/528–529, 361/533, 535–538, 539–541

See application file for complete search history.

(56) References Cited

U.S. PATENT DOCUMENTS 5,548,473 A * 8/1996 Wang ........................ 361/301.1
2006/0146481 A1 * 7/2006 Naito et al. ................. 361/528

FOREIGN PATENT DOCUMENTS

JP  05-234829  9/1993

* cited by examiner

*Primary Examiner*—Eric W. Thomas
(74) *Attorney, Agent, or Firm*—Westerman, Hattori, Daniels & Adrian, LLP.

(57) ABSTRACT

A solid electrolytic capacitor having a plurality of capacitor elements is provided that is small in size and has good electrical characteristics. The solid electrolytic capacitor includes a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin. The capacitor elements 1 are mounted on the cathode terminal 2 at an interval, the cathode terminal 2 is provided with a cathode resin-filling opening 2a, and the resin is filled between the capacitor elements 1 and in the cathode resin-filling opening 2a. Alternatively, the capacitor elements 1 are mounted side by side on the cathode terminal 2 at an interval, a distance a between the capacitor elements 1 is substantially equal to a distance b from outside surfaces of outermost capacitor elements 1 among the capacitor elements 1 to an outside surface of the housing 9, and the resin is filled between the capacitor elements 1. Alternatively, the capacitor elements 1 are mounted side by side on the cathode terminal 2 at an interval, and the cathode terminal 2 is provided with ridged portions 10 between the capacitor elements 1. Alternatively, the capacitor elements 1 are mounted side by side on the cathode terminal 2 at an interval, and a cushioning member 11 is disposed between the capacitor elements 1.

16 Claims, 7 Drawing Sheets

SOLID ELECTROLYTIC CAPACITOR

BACKGROUND OF THE INVENTION

1. Field of the Invention

The present invention relates to a solid electrolytic capacitor comprising a plurality of integrally molded capacitor elements.

2. Description of Related Art

Figure 13:
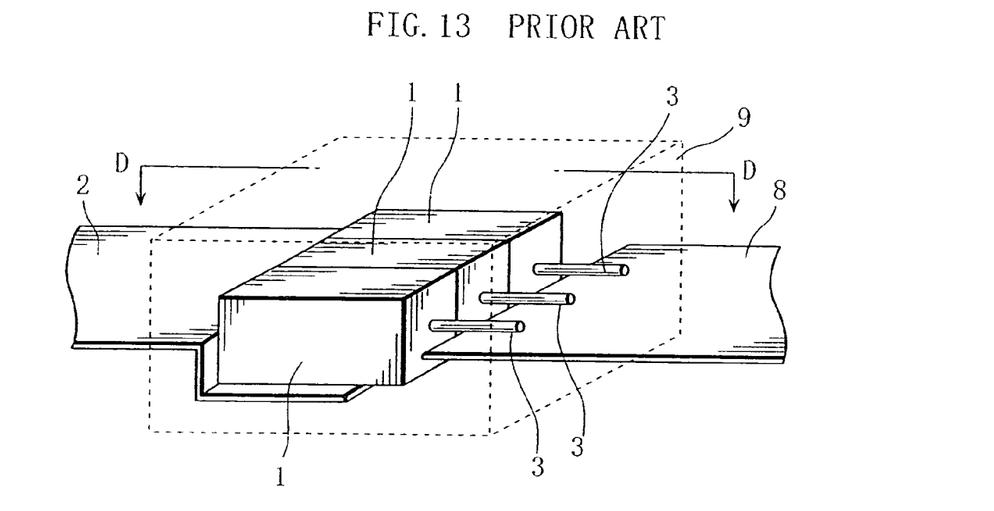
FIG. 13 is a perspective view illustrating a conventional solid electrolytic capacitor, before the anode terminal and the cathode terminal are bent.
Figure 14:
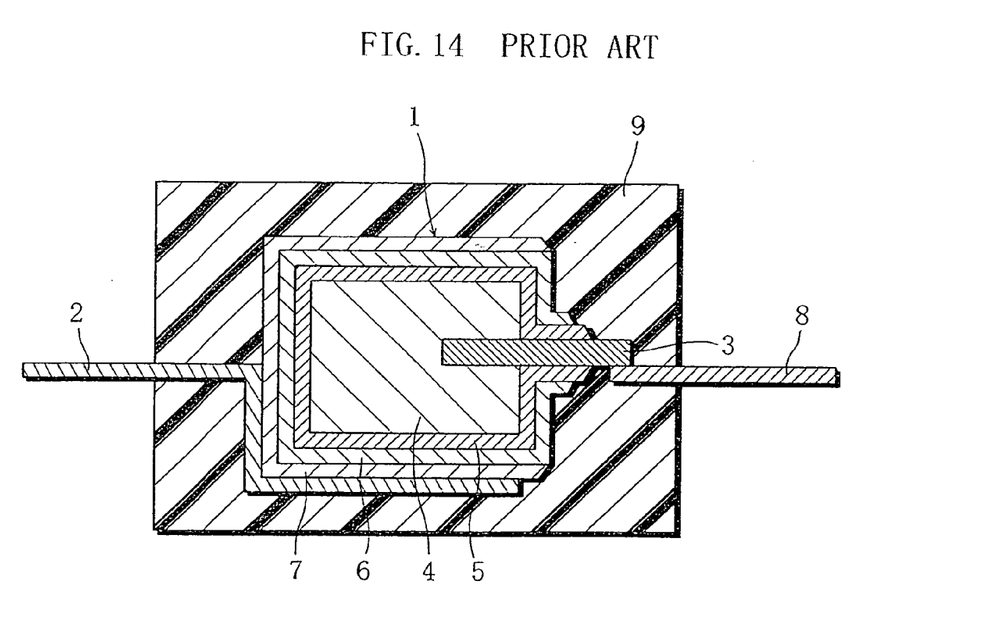
FIG. 14 is a vertical cross-sectional view taken along line D—D in FIG. 11.

An example of the solid electrolytic capacitor comprising a plurality of integrally molded capacitor elements is illustrated in FIGS. 13 and FIG. 14. In this solid electrolytic capacitor, a plurality of capacitor elements 1 are disposed side by side on a cathode terminal 2. Each of the capacitor elements 1 comprises a dielectric film 5, a cathode layer 6, and a cathode lead-out layer 7, which are formed in succession on the surface of an anode body 4. The anode body 4 is made of a valve metal and is provided with an anode lead member 3, which serves as an anode lead part. The anode lead member 3 is implanted on one end face of the anode body 4. Each of the cathode lead-out layers 7 of the capacitor elements 1 is connected to the cathode terminal 2, and each of the anode lead members 3 is connected to an anode terminal 8. The plurality of the capacitor elements 1 is covered and hermetically sealed by a housing 9 made of a synthetic resin, such as an epoxy resin.

The cathode layer 6 may be formed of a conductive inorganic material, such as manganese dioxide, or a conductive organic material, such as a TCNQ complex salt and a conductive polymer. The cathode lead-out layer 7 may be layers of, for example, a carbon layer and a silver layer formed in succession.

The cathode terminal 2 is bent in a step-like shape. After applying a conductive adhesive onto its lower step, and the plurality of the capacitor elements 1 are mounted thereon (Japanese Published Unexamined Patent Application No. 5-234829, for example).

The above-described configuration can achieve reduction in ESR (Equivalent Series Resistance) because it has a plurality of separate anode bodies 4 and accordingly the distance at which the current flows from the interior of the anode body 4 through the cathode layer 6 to the cathode terminal 2 is accordingly short. Moreover, since an additional effect of ESR reduction can be obtained because of the parallel connection of the capacitor elements 1, the completed product of the solid electrolytic capacitor attains good high frequency characteristics.

When the plurality of capacitor elements 1 are covered and hermetically sealed by the housing 9, the outside surfaces of the plurality of capacitor elements 1 are brought under a pressure force if, as described in JP 5-234829A, injection molding is carried out using a resin material such as an epoxy resin without providing a gap between the capacitor elements 1. The term "outside surfaces" means the outermost surfaces of the plurality of the capacitor elements 1; in the case that two capacitor elements 1 are arrayed on the cathode terminal 2, the surfaces of the capacitor elements 1 other than the side surfaces of the capacitor elements 1 that face each other are the outside surfaces of the capacitor elements 1. Due to the pressure force to the outside surfaces, the cathode layers 6 and the cathode lead-out layers 7 are compressed and damaged in the side surfaces facing each other of the capacitor elements 1. This has been a cause of deterioration in the capacitor's initial electrical characteristics such as ESR and LC (leakage current) and deterioration over time under a high-temperature, high-humidity environment.

Demands for smaller size, larger capacity, and lower resistance in solid electrolytic capacitors such as described above have been increasing. If the capacitor elements 1 are arranged on the cathode terminal 2 at a wide interval, the compression between the capacitor elements 1 in the injection molding can be prevented and the foregoing issue can be resolved. However, such an arrangement is undesirable because the outer dimensions of the solid electrolytic capacitor will increase.

Moreover, the capacitor elements 1 are placed under uneven loads by a pressure exerted from outside or a pressure originating from expansion of the resin in a high-temperature environment after the solid electrolytic capacitor is completed. This has also been a cause of deterioration in electrical characteristics of the solid electrolytic capacitor.

BRIEF SUMMARY OF THE INVENTION

In view of the foregoing and other problems, it is an object of the present invention to provide a solid electrolytic capacitor furnished with a plurality of capacitor elements 1 that is small in size and has good electrical performance.

In order to accomplish the foregoing and other objects, the present invention provides a solid electrolytic capacitor comprising: a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein the capacitor elements are mounted on the cathode terminal at an interval, the cathode terminal has a cathode resin-filling opening provided between the capacitor elements, and the resin is filled between the capacitor elements and in the cathode resin-filling opening.

The above-described configuration allows the resin to fill in between the capacitor elements easily in injection molding. The resin that has filled in between the capacitor elements serves the purpose of cushioning and prevents the cathode layers and cathode lead-out layers at the contact faces of the capacitor elements from being compressed, preventing deterioration in the capacitor's performance such as ESR and LC.

In the present invention, the anode terminal may have an anode resin-filling opening provided between connecting portions thereof to which the anode lead parts are connected, the anode resin-filling opening being filled with the resin.

The just-described configuration allows the resin to fill in between the capacitor elements more easily, thus preventing deterioration in the capacitor's performance such as ESR and LC more effectively.

The present invention also provides a solid electrolytic capacitor comprising: a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein the capacitor elements are mounted side by side on the cathode terminal at an interval, a distance a between the capacitor elements and a distance b from outside surfaces of the outermost capacitor elements of the capacitor elements to an outside surface of the housing is substantially equal, and the resin is filled between the capacitor elements.

The just-described configuration serves to reduce the difference between the pressure to the outside surfaces of the capacitor elements and the pressure to the space between the capacitor elements, preventing degradation in the electrical characteristics, which is due to the uneven pressure loads in injection molding to the capacitor elements and to the connecting portions between the capacitor elements and the cathode terminal. Moreover, it is possible to disperse the pressure to the capacitor elements from outside or due to the expansion of the resin under a high-temperature environment after the solid electrolytic capacitor is completed, and consequently, it is possible to prevent deterioration in the electrical characteristics of the solid electrolytic capacitor.

In the present invention, a distance c from an upper outer surface of the capacitor elements that is opposite the surface mounted on the cathode terminal to an upper outer surface of the housing may be substantially equal to the distance a and the distance b.

The just-described configuration serves to reduce the difference between the pressure applied to the upper outer surface of the capacitor elements that is opposite the surface mounted on the cathode terminal, the pressure applied between the capacitor elements, and the pressure applied to the outer surfaces of the outermost capacitor elements of the array of the capacitor elements. Thus, it becomes possible to prevent the degradation in the electrical characteristics, which is due to the uneven pressure loads applied to the capacitor elements and to the connecting portions between the capacitor elements and the cathode terminal during the injection molding.

In the present invention, the cathode terminal may have a cathode resin-filling opening provided between the capacitor elements, and the resin may be filled between the capacitor elements and in the cathode resin-filling opening.

The above-described configuration allows the resin to fill in between the capacitor elements easily, thus preventing deterioration in the capacitor's performance such as ESR and LC.

In the present invention, a distance d from a lower outer surface of the capacitor elements mounted on the cathode terminal to a lower outer surface of the housing may be substantially equal to the distance a, the distance b, and the distance c.

The just-described configuration serves to reduce the difference between the pressure applied to the lower outer surface of the capacitor elements mounted on the cathode terminal, the pressure applied between the capacitor elements, the pressure applied to the outside surfaces of the outermost capacitor elements of the array of the capacitor elements, and the pressure applied to the upper outer surface of the capacitor elements that is opposite the surface mounted on the cathode terminal. Thus, it becomes possible to prevent the degradation in the electrical characteristics, which is due to the uneven pressure loads in injection molding to the capacitor elements and to the connecting portions between the capacitor elements and the cathode terminal.

In the present invention, all the plurality of the capacitor elements may have a substantially rectangular parallelepipedal outer shape.

The just-described configuration serves to reduce the difference in the pressures per unit area that are applied to the lower outer surface of the capacitor elements mounted on the cathode terminal, between the capacitor elements, to the outside surface of the capacitor elements, to the upper outer surface of the capacitor elements that is opposite the surface mounted on the cathode terminal. Thus, it becomes possible to prevent the degradation in the electrical characteristics, which is due to the uneven pressure loads in injection molding to the capacitor elements and to the connecting portions between the capacitor elements and the cathode terminal.

The present invention also provides a solid electrolytic capacitor comprising: a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein the capacitor elements are mounted on the cathode terminal at an interval; and the cathode terminal has ridged portions between the capacitor elements.

The just-described configuration makes positioning of the capacitor elements easy and at the same time prevents the cathode layers and the cathode lead-out layers in the contact faces of the capacitor elements from being damaged by compression or collision of the capacitor elements resulting from the pressure originating from injection molding.

In the present invention, the cathode terminal may have a cathode resin-filling opening provided between the capacitor elements and formed by providing the ridged portions; and the resin may be filled between the capacitor elements and in the cathode resin-filling opening.

The just-described configuration allows the resin to fill in between the capacitor elements easily in injection molding. This makes it possible to prevent the deterioration over time of the cathode layers and the cathode lead-out layers originating from the moisture or air infiltrating from the interfaces between the terminals and the housing, and thus to maintain good electrical characteristics.

In the present invention, the capacitor elements may be disposed to form an array on the cathode terminal; and the cathode terminal may further have ridged portions at opposite ends of the array of the capacitor elements.

The just-described configuration enables the positioning of the capacitor elements disposed at the opposite ends of the cathode terminal to be more accurately. Moreover, by forming the ridged portions high along the side faces of the capacitor elements, the pressure applied to the outer peripheral surface of the capacitor elements in injection molding can be alleviated. This can prevent the cathode layers and the cathode lead-out layers from being damaged and attain good electrical characteristics.

The present invention also provides a solid electrolytic capacitor comprising: a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein the capacitor elements are mounted on the cathode terminal side by side at an interval; and a cushioning member is provided between the capacitor elements.

The just-described configuration can prevent the cathode layers and the cathode lead-out layers in the contact faces of the capacitors from being compressed in injection molding, and prevent deterioration in capacitor performance such as ESR and LC.

In the present invention, the cushioning member may be made of a material having a thermal expansion coefficient less than that of the resin.

The just-described configuration serves to reduce the pressure to the space between the capacitor elements due to the expansion of the cushioning member even under a high-temperature environment, thus preventing degradation in the electrical characteristics.

The present invention makes it possible provide a solid electrolytic capacitor furnished with a plurality of capacitor elements, that is small in size and has good electrical characteristics.

DETAILED DESCRIPTION OF THE INVENTION

A capacitor element 1 used for a solid electrolytic capacitor of the present invention may be fabricated in a similar manner to the method used for conventional capacitor elements. The capacitor element 1 has an anode body 4, a dielectric film 5, a cathode layer 6, and a cathode lead-out layer 7 formed in succession.

The anode body 4 is made of sintered compact of a valve metal, such as tantalum, niobium, aluminum, and titanium. In addition to the sintered compact, materials in a plate form or a foil form may be used as the anode body 4. When using the sintered compact, an anode lead member 3 implanted on one end face of the anode body 4 may be used as the anode lead part. When using the material in a plate-shaped form or a foil-shaped form, the portion in which the dielectric film 5 is not formed may be used as the anode lead part. The dielectric film 5 is formed by subjecting the surface of the anode body 4 to a formation process. The cathode layer 6 may be made of a conductive inorganic material such as manganese dioxide, or a conductive organic material such as a TCNQ complex salt or a conductive polymer. The cathode lead-out layer 7 may be made of a material that has been conventionally used, such as a carbon layer and a metal layer either alone or in combination. An anode terminal 8 is connected to the anode lead member 3 of the anode body 4, and a cathode terminal 2 is connected to the cathode lead-out layer 7 of the capacitor element 1. The outer periphery of a plurality of the capacitor elements 1 is covered and hermetically sealed by a housing 9 made of resin, and portions of the cathode terminals 2 and the anode terminals 8 are exposed from the housing 9.

The solid electrolytic capacitor of the present invention comprises a plurality of the capacitor elements 1 mounted on the cathode terminal 2 at a predetermined interval. The number of the capacitor elements 1 that are integrally formed within the housing 9 is not particularly limited as long as it is two or greater, although the number of the capacitor elements 1 employed in the following examples and comparative examples is two.

In first to fourth embodiments that follow, the cathode terminal 2 and the anode terminal 8 extend outside the housing 9 from substantially the middle point along the height of the solid electrolytic capacitor and are bent along the housing 9. However, the surfaces from which the cathode terminal 2 and the anode terminal 8 extend are not particularly limited, and for example, the cathode terminal 2 and the anode terminal 8 may be in a plate shape and extend from the lower surface of the solid electrolytic capacitor so that the cathode terminal 2 and the anode terminal 8 are exposed at the same surface level as that of the housing 9. In addition, the resin that forms the housing 9 is not particularly limited, and various resins, such as an epoxy resin, a urethane resin, and a silicone resin, may be used.

First Embodiment

EXAMPLE

Hereinbelow, an example of a first embodiment according to the present invention is described with reference to the drawings. It should be noted that the solid electrolytic capacitor according to the first embodiment of the present invention is referred to as a solid electrolytic capacitor A, and the solid electrolytic capacitors of Comparative Examples 1 and 2 in the first embodiment are referred to as solid electrolytic capacitors X1 and Y1, respectively.

Figure 1:
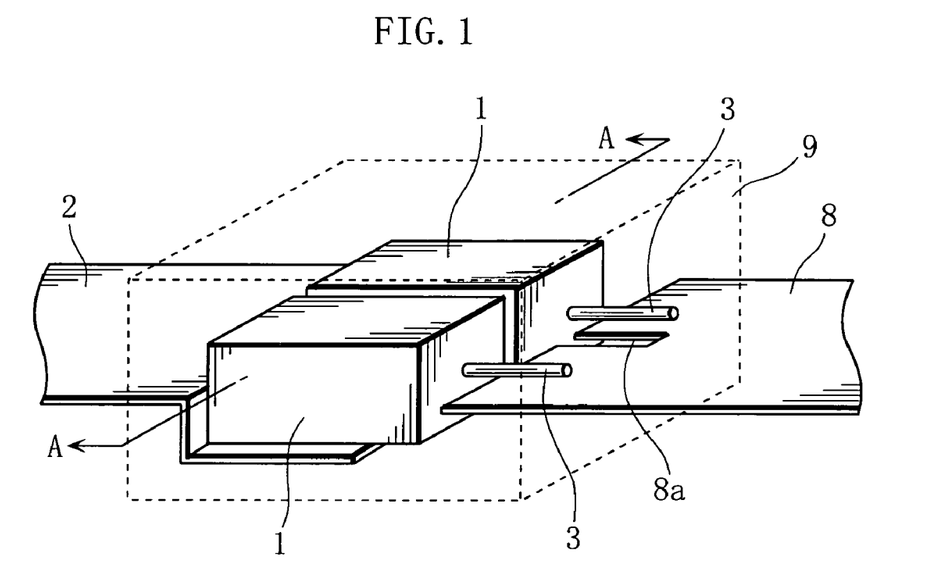
FIG. 1 is a perspective view illustrating a solid electrolytic capacitor of an example according to a first embodiment, before the anode terminal and the cathode terminal are bent.
Figure 2:
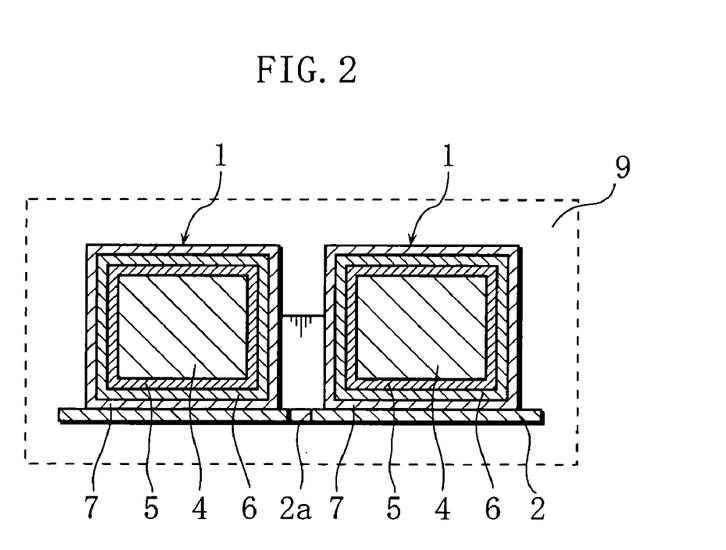
FIG. 2 is a vertical cross-sectional view taken along line A—A in FIG. 1.
Figure 3:
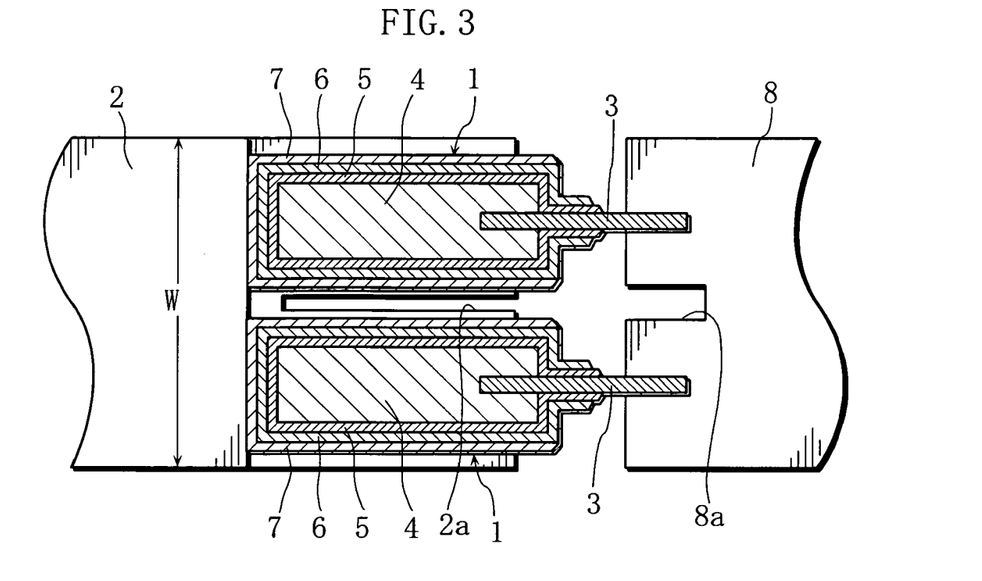
FIG. 3 is a partial horizontal cross-sectional view illustrating the example according to the first embodiment, before the housing is formed.

FIG. 1 is a perspective view illustrating the solid electrolytic capacitor of the present example, before the anode terminal 2 and the cathode terminal 8 are bent. FIG. 2 is a vertical cross-sectional view taken along line A—A in FIG. 1. FIG. 3 is a partial horizontal cross-sectional view of the capacitor, before the housing 9 is formed.

In the solid electrolytic capacitor A of the present example, two capacitor elements 1 are mounted on the cathode terminal 2 at an interval, and a cathode resin-filling opening 2a is provided at a portion of the cathode terminal 2 corresponding to the gap space between the capacitor elements 1.

Likewise, it is preferable to provide an anode resin-filling opening 8a in the anode terminal 8 and between the anode lead members 3. This allows the resin to fill in between the capacitor elements 1 more easily at the initial stage of injection molding.

The method for forming the cathode resin-filling opening 2a and the anode resin-filling opening 8a is not particularly limited and may be a known terminal processing technique. It is preferable that the cathode resin-filling opening 2a be formed to an edge of the cathode terminal 2, although the cathode resin-filling opening 2a may be a through hole provided in a portion of the cathode terminal 2.

The outer periphery of the plurality of the capacitor elements 1 is covered and hermetically sealed by the housing 9 made of resin, and portions of the cathode terminal 2 and the anode terminal 8 are exposed from the housing 9.

In the solid electrolytic capacitor A of the present example, the resin that forms the housing 9 is filled between the capacitor elements 1, in the cathode resin-filling opening 2a, and in the anode resin-filling opening 8a.

The solid electrolytic capacitor A of the present invention was fabricated in the following manner.

The anode lead member 3 was implanted on the anode body 4 made of sintered tantalum, and the anode body 4 was immersed in an aqueous solution of phosphoric acid. Then, a voltage was applied thereto to form the dielectric film 5 on the surface of the anode body 4, then the cathode layer 6 made of polypyrrole was formed on the dielectric film 5 using well-known chemical polymerization and electrolytic polymerization techniques, and further, a carbon layer and a silver layer were formed in succession as the cathode lead-out layer 7 on the cathode layer 6. Thus, the capacitor element 1 was fabricated.

Next, the cathode terminal 2 was bent in a step-like shape, and the cathode resin-filling opening 2a was provided at a middle portion of a width W of the cathode terminal 2 that is in the lower step portion of the cathode terminal 2 on which the capacitor elements 1 were supposed to be mounted. Thereafter, a conductive adhesive was applied onto the portion of the cathode terminal 2 on which the capacitor elements 1 were supposed to be disposed, and two capacitor elements 1 were mounted so that the cathode resin-filling opening 2a was interposed therebetween, followed by connecting the cathode terminal 2 and the respective cathode lead-out layers 7. The distance between the two capacitor elements 1 was set at 0.3 mm. The anode terminal 8 was provided with the anode resin-filling opening 8a with a size of 0.5 mm between the connecting portions to the anode lead members 3, and the anode lead members 3 were attached to the anode terminal 8 by resistance welding.

Thereafter, the capacitor elements 1 to which the cathode terminal 2 and the anode terminal 8 were attached was disposed in a metal mold, and an epoxy resin as the resin was heated to 180° C. to melt the resin. The molten resin was injected into a cavity formed in the metal mold by applying a pressure of about 100 atm thereto. In that state, the temperature was kept for several minutes to thermally cure the resin, so that the housing 9 for covering and hermetically sealing the plurality of capacitor elements 1 was formed. The resin was also filled between the capacitor elements 1, in the cathode resin-filling opening 2a, and in the anode resin-filling opening 8a. Thereafter, the cathode terminal 2 and the anode terminal 8 were bent along the outer peripheral surface of the housing 9, whereby a solid electrolytic capacitor A having outer dimensions of 7.3 mm×4.3 mm×2.8 mm was completed.

COMPARATIVE EXAMPLE 1

Figure 4:
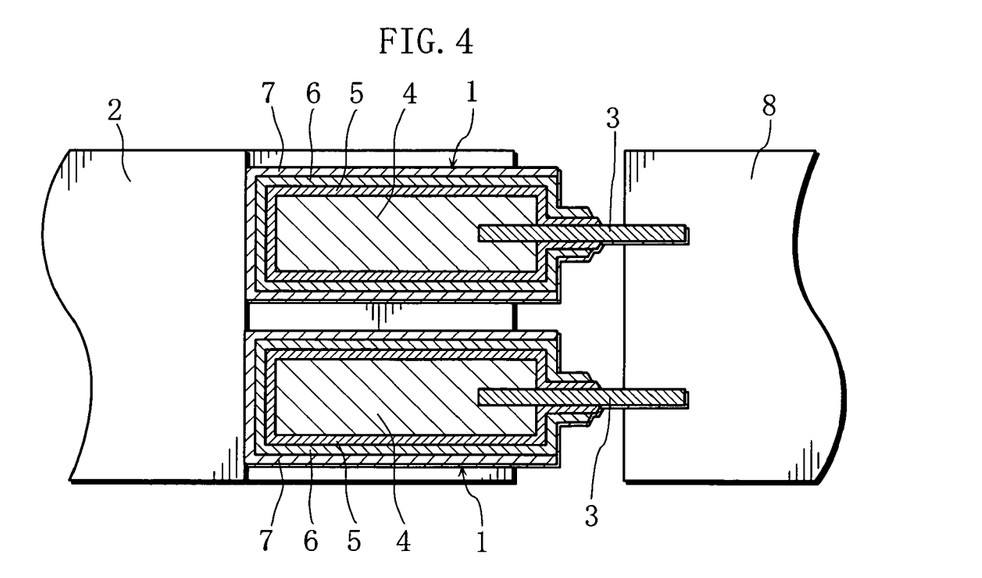
FIG. 4 is a partial horizontal cross-sectional view illustrating Comparative Example 1 in the first embodiment, before the housing is formed.

FIG. 4 is a partial horizontal cross-sectional view illustrating the solid electrolytic capacitor X1 of Comparative Example 1, before the housing 9 is formed. In the solid electrolytic capacitor X1, the cathode terminal 2 was not provided with the cathode resin-filling opening 2a, and two capacitor elements 1 were disposed on the cathode terminal 2 at the same interval (0.3 mm) as in the above Example. The housing 9 was formed in the same conditions as in the above Example. Here, the resin that formed the housing 9 was cured without having been filled in between the capacitor elements 1. Then, the solid electrolytic capacitor X1 having the same outer dimensions as that of the capacitor A was fabricated through the same subsequent steps as in the above Example.

COMPARATIVE EXAMPLE 2

Figure 5:
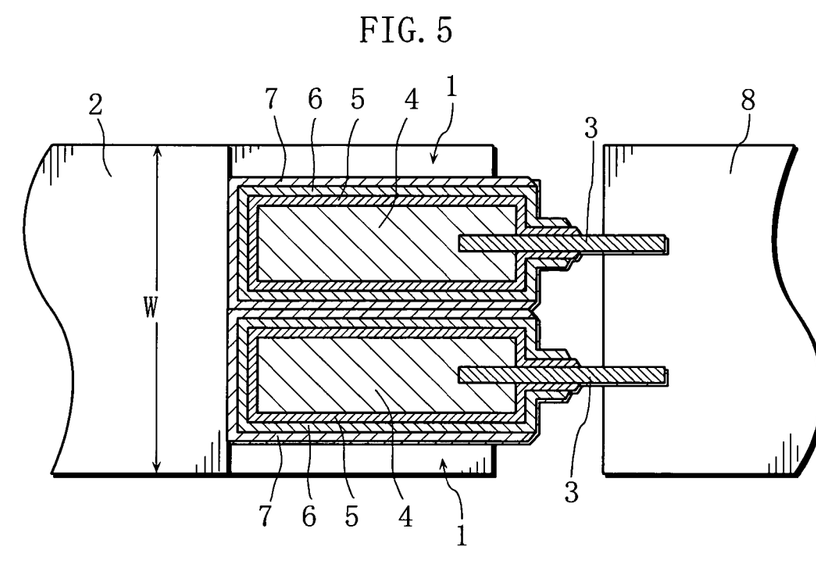
FIG. 5 is a partial horizontal cross-sectional view illustrating Comparative Example 2 in the first embodiment, before the housing is formed.

FIG. 5 is a partial horizontal cross-sectional view illustrating the solid electrolytic capacitor Y1 of Comparative Example 2, before the housing 9 is formed. The solid electrolytic capacitor Y1 was fabricated so as to have the same outer dimensions and in the same manner as in the above Example, except that no cathode resin-filling opening 2a was provided in the cathode terminal 2 and two capacitor elements 1 were disposed side by side without providing a gap therebetween.

Ten samples of each of the foregoing Example, Comparative Example 1, and Comparative Example 2 were prepared, and their initial characteristics were measured. Thereafter, the samples were subjected to a high-temperature load test, in which the samples were set aside at 105° C. for 5000 hours while applying a constant voltage of 2.5 V, and mean values of the characteristics with 5 samples per each example were obtained. The results are summarized in Table 1.

In addition, ten samples of each of the foregoing Example, Comparative Example 1, and Comparative Example 2 were subjected to a humidity no-load test, in which the samples were set aside in an atmosphere at 60° C. and with a relative humidity of 90% to 95% for 5000 hours while applying no voltage, and mean values of the characteristics with five samples of each of the foregoing Example, Comparative Example 1, and Comparative Example 2 were obtained. The results are summarized in Table 2. The characteristics measured were ESR and LC. ESR values were measured according to a four-terminal resistance measurement technique at a frequency of 100 kHz using an LCR meter. LC values were obtained as follows; a 1 kΩ resistor was connected in series with the capacitor subjected to the measurement, and a voltage measured by a voltmeter connected in parallel to the resistor was divided by the resistance value.

TABLE 1

|   | Initial characteristics | | After high-temperature load test (5000 hrs.) | |
|---|---|---|---|---|
|   | ESR (mΩ) | LC (μA) | ESR (mΩ) | LC (μA) |
| A | 7.2 | 10.4 | 8.8 | 9.6 |
| X1 | 7.7 | 11.4 | 10.3 | 11 |
| Y1 | 8.9 | 25.1 | 18.8 | 16.2 |

TABLE 2

| | Initial characteristics | | After humidity no-load test (5000 hrs.) | |
|---|---|---|---|---|
| | ESR (mΩ) | LC (μA) | ESR (mΩ) | LC (μA) |
| A | 7.2 | 10.4 | 8.0 | 5.2 |
| X1 | 7.7 | 11.4 | 9.1 | 7.9 |
| Y1 | 8.9 | 25.1 | 10.8 | 20.0 |

As seen in Tables 1 and 2 above, the solid electrolytic capacitor A of the present example exhibited improved initial ESR and LC characteristics over the solid electrolytic capacitors X1 and Y1 of Comparative Examples 1 and 2. It is believed that the solid electrolytic capacitor A of the present example showed improved electrical characteristics over the solid electrolytic capacitor Y1 of Comparative Example 2 for the following reason. In the solid electrolytic capacitor A, the resin that formed the housing 9 was able to easily fill in the gap space between the capacitor elements 1 at the initial stage of the injection molding, and the resin that filled therein served the purpose of cushioning, thus preventing the cathode layers 6 and the cathode lead-out layers 7 in the facing side surfaces of the capacitor elements 1 from being compressed. Thus, deterioration in the capacitor performance such as ESR and LC was prevented.

What is particularly remarkable is that the improvement effect in the electrical characteristics was obtained, despite the fact that the gap between the capacitor elements 1 was the same in both the present example and Comparative Example 1 (0.3 mm in both) and thus there was no adverse effect in their outer dimensions.

In the case of Comparative Example 1, a plurality of the capacitor elements 1 are disposed on the cathode terminal 2 at such an interval as to not change the outer dimensions, so the cathode layers 6 and the cathode lead-out layers 7 in the facing side surfaces of the capacitor elements 1 are not compressed, unlike Comparative Example 2. However, the resin that forms the housing 9 is not easily brought in between the capacitor element 1, and therefore, the initial electrical characteristics degrade because of the adverse effects originating from the pressure of the resin at the initial stage of injection molding. It is also believed that when a portion unfilled by the resin remains between the capacitor elements 1, conductivity of the cathode layers 6 and the cathode lead-out layers 7 deteriorates over time because of the adverse effects originating from the air that has remained therein. It is also believed that the adverse effects originating from moisture under a high-humidity environment become significant in the portion unfilled by the resin, and humidity resistance degrades.

In contrast, the solid electrolytic capacitor A of the present example was free from the just-described problems, and thus was able to obtain good electrical characteristics in both the initial characteristics and in the characteristics after the high-temperature load test and the humidity test no-load test.

Second Embodiment

EXAMPLE

Hereinbelow, an example of the second embodiment according to the present invention is described with reference to the drawings. It should be noted that the solid electrolytic capacitor according to the second embodiment of the present invention is referred to as a solid electrolytic capacitor B, and the solid electrolytic capacitors of Comparative Examples 1 and 2 in the second embodiment are referred to as solid electrolytic capacitors X2 and Y2, respectively.

Figure 6:
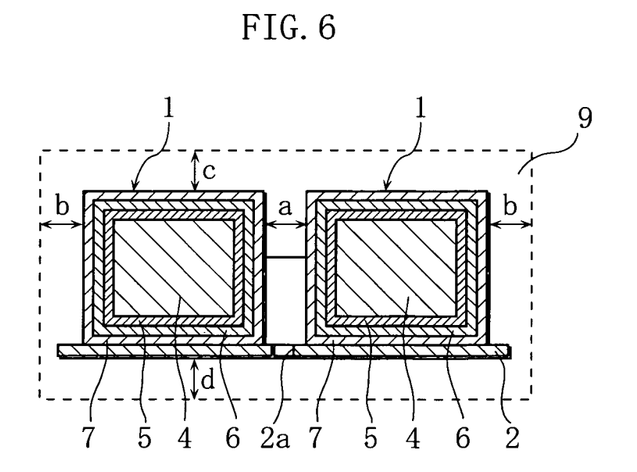
FIG. 6 is a vertical cross-sectional view illustrating a solid electrolytic capacitor of an example according to a second embodiment, which corresponds to the vertical cross-sectional view illustrating the solid electrolytic capacitor of the first embodiment taken along line A—A in FIG. 1.

FIG. 6 is a vertical cross-sectional view illustrating the solid electrolytic capacitor B of the present example, which corresponds to the vertical cross-sectional view illustrating the solid electrolytic capacitor A of the first embodiment taken along line A—A in FIG. 1. It should be noted that in the present example, the perspective view illustrating the solid electrolytic capacitor B before the cathode terminal 2 and the anode terminal 8 are bent and the top view illustrating the capacitor before the housing 9 is formed are not shown because they will result in approximately the same views as FIGS. 1 and 3, respectively.

The solid electrolytic capacitor B of the present example is formed so that an interval distance a between the capacitor elements 1 and a distance b from the outside surface of the outer most capacitor elements 1 of the array of the capacitor elements 1 to the outside surface of the housing 9 are substantially equal to each other. Specifically, it is preferable that the interval distance a between the capacitor elements 1 be the interval distance between the facing side surfaces of the capacitor elements 1 disposed side by side when the capacitor elements 1 have a rectangular parallelepiped shape, while when the outer shape of the capacitor elements 1 is not a rectangular parallelepiped shape and the facing surfaces are not parallel to each other, it is preferable that the interval distance a be the minimum distance among the interval distances of the facing surfaces.

It should be noted that in the description of the present example, the term "the outside surface of the housing 9" means the outermost surface thereof, and that the term "outside surfaces of the capacitor elements 1" means outer side faces of the outermost capacitor elements 1 of the array of the capacitor elements 1, in other words, side faces of the outermost capacitor elements 1 that are opposite to side faces of the outermost capacitor elements 1 and the inner capacitor elements 1 that face each other.

It is preferable that the distance b should be defined by the distance between the outside surface of the housing 9 and the outside surfaces of the capacitor element 1 when the respective surfaces are substantially parallel to each other, as in the case that both the capacitor elements 1 and the housing 9 have a rectangular parallelepipedal outer shape, while when either of them has a different shape, the distance b should be defined by the minimum distance from the outside surfaces of the capacitor element 1 to the outside surface of the housing 9.

Using the configuration according to the present embodiment makes it possible to bring close to each other the pressure applied from the side faces in the array direction of the capacitor elements 1 and the pressure between the capacitor elements 1, which originates from the resin in injection molding, thus preventing the capacitor elements 1 from being partially brought under a large load. Moreover, even if, for example, a pressure arises from outside or the resin expands under a high-temperature environment after the solid electrolytic capacitor has been completed, the load applied to the capacitor elements can be dispersed, and deterioration in the electrical characteristics can be prevented.

It is also preferable that the distance c from the upper outer surfaces of the capacitor elements 1 that are opposite to the surfaces mounted on the cathode terminal 2 to the upper outer surface of the housing 9 be substantially equal to the distance a and the distance b. In the description of the present invention, the surfaces mounted on the cathode terminal 2 are referred to as lower outer surfaces of the capacitor elements 1, and the surfaces that are opposite to the lower outer surfaces are referred to as upper outer surfaces. Because the lower outer surfaces of the capacitor elements 1 mounted on the cathode terminal 2 are protected by the cathode terminal 2, the pressure originating from load from outside and the expansion of the resin in a high-temperature environment after the solid electrolytic capacitor has been completed can be alleviated in the lower outer surfaces. On the other hand, in the upper outer surface, which is opposite to the lower outer surface, the pressure can be further alleviated by providing the resin with a thickness substantially equal to the distance a and the distance b.

In addition, it is preferable that the cathode terminal 2 be provided with a cathode resin-filling opening 2a between the capacitor elements 1 and the anode terminal 8 be provided with an anode resin-filling opening 8a between the anode lead members 3. This allows the resin to fill in between the capacitor elements 1 at the initial stage of injection molding, enabling to disperse the pressure at the initial stage of the injection molding. Thus, the electrical characteristics such as ESR and LC can be prevented from degradation.

It is preferable that the cathode resin-filling opening 2a be formed to the edge of the cathode terminal 2 at the anode lead member 3 side. This enables to fill the resin into the cathode resin-filling opening 2a from the anode lead member 3 side easily.

In addition, it is preferable that in the case that the cathode resin-filling opening 2a is formed, a distance d from the lower outer surfaces of the capacitor elements 1 mounted on the cathode terminal to the lower outer surface of the housing 9 be substantially equal to the distance a, the distance b, and the distance c. This allows the resin to easily fill in between the capacitor elements 1 from below and above at the initial stage of the injection molding, and the filled resin serves as cushioning to alleviate the load to the capacitor elements 1.

The solid electrolytic capacitor B of the present example was fabricated in the following manner.

The capacitor elements 1 were fabricated in the same manner as in the Example of the first embodiment, and each of them was formed in a rectangular parallelepipedal shape having outer dimensions of 4.3 mm×1.7 mm×1.4 mm.

Next, the cathode terminal 2 was bent in a step-like shape, and a 0.1 mm-wide cathode resin-filling opening 2a was provided at a middle potion along a width W of the cathode terminal 2 and in the lower step portion of the cathode terminal 2 on which the capacitor elements 1 were supposed to be mounted. Thereafter, a conductive adhesive was applied onto the cathode terminal 2, and two capacitor elements 1 were mounted thereon at an interval of 0.3 mm (distance a), followed by connecting the cathode terminal 2 to respective cathode lead-out layers 7. Thus, a solid electrolytic capacitor B having a rectangular parallelepipedal outer shape (7.3 mm×4.3 mm×2.8 mm) was completed, which was in other respects similar to the Example of the first embodiment.

The solid electrolytic capacitor B thus fabricated was cut along the plane that contains line A—A shown in FIG. 1 to measure the distance b from the outside surfaces of the capacitor elements 1 to the outside surface of the housing 9. It was found that the distance b was within the range of from 0.2 mm to 0.4 mm, and was substantially equal to the distance a.

The distance c from the upper outer surfaces of the capacitor elements 1 to the upper outer surface of the housing 9, and the distance d from the lower outer surfaces of the capacitor elements 1 to the lower outer surface of the housing 9 both were within the range of from 0.6 mm to 0.8 mm.

COMPARATIVE EXAMPLE 1

The solid electrolytic capacitor X2 of Comparative Example 1 was fabricated and the housing 9 was formed in the same conditions as in the Example of the second embodiment except that, as illustrated in FIG. 4, the cathode resin-filling opening 2a was not provided in the cathode terminal 2, that the anode resin-filling opening 8a was not provided in the anode terminal 8, and that the two capacitor elements 1 were disposed on the cathode terminal 2 at an interval of 0.1 mm (distance a). Here, the resin was cured without having been filled in between the capacitor elements 1. Then, the solid electrolytic capacitor X2 having the same outer dimensions as the capacitor B was fabricated through the same subsequent steps as in the Example of the second embodiment. The solid electrolytic capacitor X2 thus fabricated was cut along the plane described in the Example of the second embodiment to measure the distance b from the outside surfaces of the capacitor elements 1 to the outside surface of the housing 9. It was found that the distance b was within the range of from 0.3 mm to 0.5 mm.

COMPARATIVE EXAMPLE 2

The solid electrolytic capacitor Y2 of Comparative Example 2 was fabricated so as to have the same outer dimensions and in the same manner as in the Example of the second embodiment, except that, as illustrated in FIG. 5, the two capacitor elements 1 were disposed side by side without providing a gap therebetween.

Table 3 below summarizes the results of an initial characteristics measurement and a subsequent high-temperature load test, which were conducted using samples of the Example, the Comparative Example 1, and the Comparative Example 2 of the second embodiment under the same conditions as in the Example, the Comparative Example 1, and the Comparative Example 2 of the foregoing first embodiment.

Likewise, Table 4 below summarizes the results of the initial characteristics measurement and a subsequent humidity no-load test, which were conducted using samples of the Example, the Comparative Example 1, and the Comparative Example 2 of the second embodiment under the same conditions as in the Example, the Comparative Example 1, and the Comparative Example 2 of the foregoing first embodiment.

TABLE 3

| | Initial characteristics | | After high-temperature load test (5000 hrs.) | |
|---|---|---|---|---|
| | ESR (mΩ) | LC (μA) | ESR (mΩ) | LC (μA) |
| B | 7.2 | 10.1 | 9.0 | 10.3 |
| X2 | 8.3 | 12.6 | 12 | 12.8 |
| Y2 | 8.9 | 25.1 | 18.8 | 16.2 |

TABLE 4

|    | Initial characteristics | | After humidity no-load test (5000 hrs.) | |
| --- | --- | --- | --- | --- |
|    | ESR (mΩ) | LC (μA) | ESR (mΩ) | LC (μA) |
| B  | 7.2 | 10.1 | 8.8 | 6.6 |
| X2 | 8.3 | 12.6 | 9.6 | 9.5 |
| Y2 | 8.9 | 25.1 | 10.8 | 20.0 |

As seen in Tables 3 and 4 above, the solid electrolytic capacitor B of the present example exhibited improved initial ESR and LC characteristics over the solid electrolytic capacitors X2 and Y2 of Comparative Examples 1 and 2.

It is believed that, in the solid electrolytic capacitor Y2 of Comparative Example 2, the cathode layers 6 and the cathode lead-out layers 7 in the facing side surfaces of the capacitor elements 1 were compressed by the pressure during the injection molding, and the initial ESR and LC characteristics as well as the heat resistance and the humidity resistance were degraded considerably.

It is believed that when a plurality of the capacitor elements 1 are disposed on the cathode terminal 2 at such an interval as to not change the outer dimensions as in the solid electrolytic capacitor X2 of Comparative Example 1, the resin is not easily brought in between the capacitor elements 1, although the cathode layers 6 and the cathode lead-out layers 7 in the facing side surfaces of the capacitor elements 1 will not be compressed unlike the case of Comparative Example 2. Therefore, the initial electrical characteristics degrade because of the adverse effects originating from the pressure of the resin at the initial stage of injection molding. It is also believed that when a portion unfilled by the resin is left between the capacitor elements 1, conductivity of the cathode layers 6 and the cathode lead-out layers 7 deteriorates over time because of the adverse effects caused by the air that has remained inside or the air and moisture infiltrating from the interface between the housing 9 and the terminals.

In contrast, it is believed that the solid electrolytic capacitor B according to the above Example was able to prevent deterioration in the electrical characteristics because the solid electrolytic capacitor B was capable of bringing the pressure between the capacitor elements 1 and the pressure of the resin applied from the side faces in the array direction of the capacitor elements 1 at the initial stage of injection molding close to each other and thereby prevent the capacitor elements 1 from being partially brought under a large load pressure.

Moreover, in the solid electrolytic capacitor B of the above Example, the distance a and the distance b shown in FIG. 6 are substantially equal to each other, and therefore, the solid electrolytic capacitor B is capable of bringing close to each other the pressure applied from the side faces of the array of the capacitor elements 1 and the pressure between the capacitor elements 1, which are due to, for example, the stress from outside during the injection molding and after the solid electrolytic capacitor is completed and the expansion of the resin under a high-temperature environment, thus preventing the capacitor elements 1 from being partially brought under a large load. It is inferred that this enabled to minimize damages to the cathode layers 6 and the cathode lead-out layers 7 of the capacitor elements 1 and to prevent deterioration in capacitor performance such as ESR and LC.

In addition, it is believed that the degradation in electrical characteristics caused by the adverse effects originating from the air or moisture infiltrating from the interface between the housing 9 and the terminals was prevented because the resin had filled in between the capacitor elements 1.

It should be noted that although in the above Example the distance c from the upper outer surfaces of the capacitor elements 1 to the upper outer surface of the housing 9 and the distance d from the lower outer surfaces of the capacitor elements 1 to the lower outer surface of the housing 9 were both in the range of from 0.6 mm to 0.8 mm, the distance c and/or the distance d may be within the range of from 0.2 mm to 0.4 mm. The reason is as follows. When the relationship between the distance a and the distance b is varied as in the above Example and Comparative Examples 1 and 2, the performance of the solid electrolytic capacitors varies. Therefore, it is expected that the performance of the solid electrolytic capacitor will be improved further if the distance c and/or the distance d is/are set to be substantially equal values to the distance a and the distance b.

Third Embodiment

EXAMPLE

Hereinbelow, an example of the third embodiment according to the present invention is described with reference to the drawings. It should be noted that the solid electrolytic capacitor according to the third embodiment of the present invention is referred to as a solid electrolytic capacitor C, and the solid electrolytic capacitors of Comparative Examples 1 and 2 in the third embodiment are referred to as solid electrolytic capacitors X3 and Y3, respectively.

Figure 7:
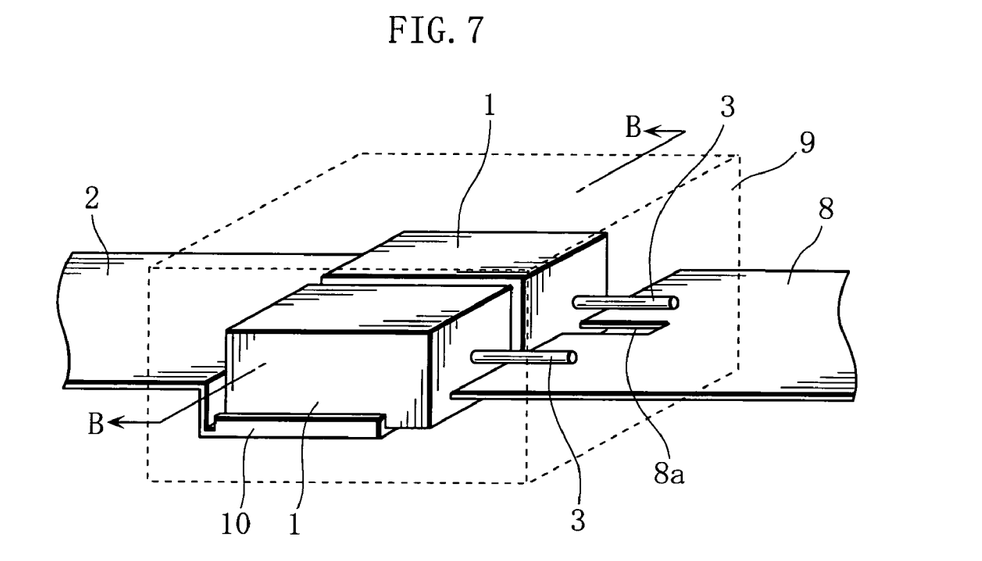
FIG. 7 is a perspective view illustrating a solid electrolytic capacitor of an example according to a third embodiment, before the anode terminal and the cathode terminal are bent.
Figure 8:
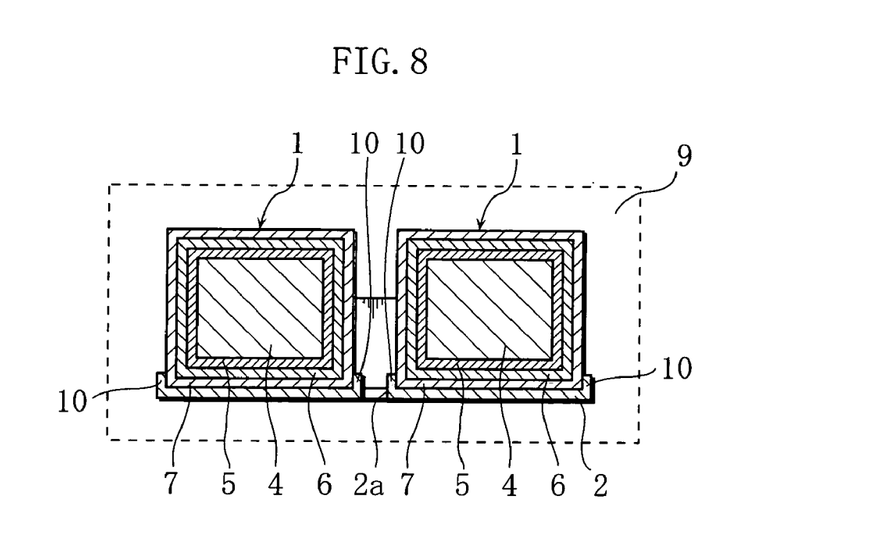
FIG. 8 is a vertical cross-sectional view taken along line B—B in FIG. 7.
Figure 9:
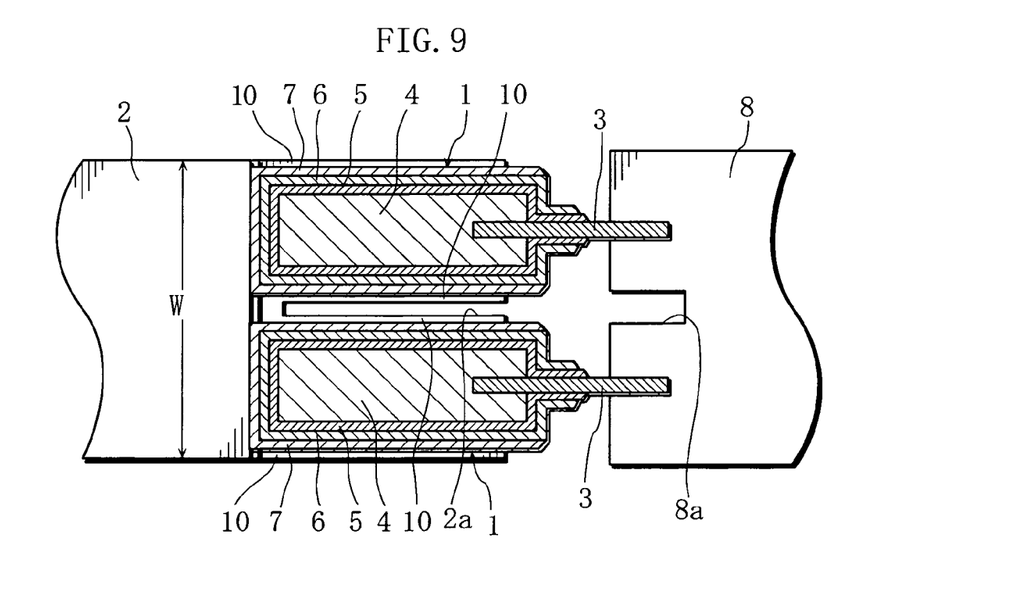
FIG. 9 is a partial horizontal cross-sectional view illustrating the example of the third embodiment, before the housing is formed.

FIG. 7 is a perspective view illustrating the solid electrolytic capacitor C of the present example, before the anode terminal 2 and the cathode terminal 8 are bent. FIG. 8 is a vertical cross-sectional view taken along line B—B in FIG. 7. FIG. 9 is a partial, horizontal cross-sectional view illustrating the capacitor, before the housing 9 is formed.

The solid electrolytic capacitor C in the present example has a cathode terminal 2 provided with ridged portions 10 so as to isolate each of the capacitor elements 1. The ridged portions 10 are preferably formed by bending the cathode terminal 2. It is also preferable that the ridged portions 10 be formed so that the resin that forms the housing 9 can easily fill in between the capacitor elements 1. For example, cuts are formed in the cathode terminal 2 between the capacitor elements 1, and the cut portions are bent toward the capacitor elements 1 side, whereby the cathode resin-filling opening 2a is formed so that the resin can be filled therein from the cathode terminal 2 side.

The capacitor elements 1 are mounted at respective positions on the cathode terminal 2 that are divided by the ridged portions 10. Therefore, the capacitor elements 1 are ensured to be in a non-contact state even if a pressure is applied between the capacitor elements 1 from the outside surfaces of the capacitor elements 1 during the injection molding, which is the step of forming the housing.

Likewise, it is preferable that the anode terminal 8 be provided with an anode resin-filling opening 8a formed between the anode lead members 3. This allows the resin to fill in between the capacitor elements 1 more easily at the initial stage of the injection molding so that the pressure applied during the injection molding can be dispersed since the resin serves as cushioning. Thus, degradation in electrical characteristics such as ESR and LC can be prevented. The method for forming the ridged portions 10 is not particularly limited, and well-known terminal process techniques may be employed. Moreover, it is preferable that the ridged portions 10 and the cathode resin-filling opening 2a be formed to the edge of the cathode terminal 2 at the anode lead member 3 side. This allows the resin to be filled in the cathode resin-filling opening 2a from the anode lead member 3 side more easily.

The solid electrolytic capacitor C of the present example was fabricated in the following manner.

The capacitor elements 1 were prepared in the same manner as in the Example of the first embodiment.

Next, the cathode terminal 2 was bent in a step-like shape, and cuts were formed at a middle portion of a width W of the cathode terminal 2 that is in the lower step portion of the cathode terminal 2 on which the capacitor elements 1 were supposed to be mounted, to form ridged portions 10 by bending the cut edges in an L-shape toward the capacitor elements 1 side. Thereby, the cathode resin-filling opening 2a was formed in the cathode terminal 2 between two capacitor elements 1. In addition, the outside edges of the cathode terminal 2 along the direction in which the capacitor elements 1 are arrayed were bent likewise in an L-shape to form ridged portions 10.

Thereafter, a conductive adhesive was applied onto spaces positioned by the ridged portions 10 of the cathode terminal 2, and the two capacitor elements 1 were mounted thereon across the cathode resin-filling opening 2a, followed by connecting the cathode terminal 2 to the cathode lead-out layers 7. The interval between the two capacitor elements 1 was 0.3 mm. In addition, an anode resin-filling opening 8a with a size of 0.5 mm was provided between connecting portions of the anode terminal 8 to which the anode lead members 3 were supposed to be connected, and anode lead members 3 were attached to the anode terminal 8 by resistance welding. Thus, a solid electrolytic capacitor C having a rectangular parallelepipedal outer shape (7.3 mm×4.3 mm×2.8 mm) was completed, which was in other respects similar to the Example of the first embodiment.

COMPARATIVE EXAMPLE 1

The solid electrolytic capacitor X3 of Comparative Example 1 was fabricated and the housing 9 was formed in the same conditions as in the Example of the third embodiment except that, as illustrated in FIG. 4, the cathode terminal 2 was provided with no ridged portion 10, and that the two capacitor elements 1 were disposed side by side on the cathode terminal 2 at the same interval (0.3 mm) as that in the Example of the third embodiment. Here, the resin was cured without having been filled in between the capacitor elements 1. Then, the solid electrolytic capacitor X3 having the same outer dimensions as the capacitor C was fabricated through the same subsequent steps as in the Example of the third embodiment.

COMPARATIVE EXAMPLE 2

The solid electrolytic capacitor Y3 of Comparative Example 2 was fabricated so as to have the same outer dimensions and in the same manner as in the Example of the third embodiment, except that, as illustrated in FIG. 5, the cathode terminal 2 was not provided with no ridged portion 10 and that the two capacitor elements 1 were disposed side by side without providing a gap therebetween.

Table 5 below summarizes the results of an initial characteristics measurement and a subsequent high-temperature load test, which were conducted using samples of the Example, the Comparative Example 1, and the Comparative Example 2 of the third embodiment under the same conditions as in the Example, the Comparative Example 1, and the Comparative Example 2 of the foregoing first embodiment.

Likewise, Table 6 below summarizes the results of the initial characteristics measurement and a subsequent humidity no-load test, which were conducted using samples of the Example, the Comparative Example 1, and the Comparative Example 2 of the third embodiment under the same conditions as in the Example, the Comparative Example 1, and the Comparative Example 2 of the foregoing first embodiment.

TABLE 5

|  | Initial characteristics | | After high-temperature load test (5000 hrs.) | |
| --- | --- | --- | --- | --- |
|  | ESR (mΩ) | LC (μA) | ESR (mΩ) | LC (μA) |
| C | 6.8 | 9.4 | 8.4 | 8.9 |
| X3 | 7.7 | 11.4 | 10.3 | 11 |
| Y3 | 8.9 | 25.1 | 18.8 | 16.2 |

TABLE 6

|  | Initial characteristics | | After humidity no-load test (5000 hrs.) | |
| --- | --- | --- | --- | --- |
|  | ESR (mΩ) | LC (μA) | ESR (mΩ) | LC (μA) |
| C | 6.8 | 9.4 | 7.8 | 5.1 |
| X3 | 7.7 | 11.4 | 9.1 | 7.9 |
| Y3 | 8.9 | 25.1 | 10.8 | 20.0 |

As seen in Tables 5 and 6 above, the solid electrolytic capacitor C of the present example exhibited improved initial ESR and LC characteristics over the solid electrolytic capacitors X3 and Y3 of Comparative Examples 1 and 2.

It is believed that, in the solid electrolytic capacitor Y3 of Comparative Example 2, the cathode layers 6 and the cathode lead-out layers 7 in the facing side surfaces of the capacitor elements 1 were compressed by the pressure during the injection molding, and the initial ESR and LC characteristics as well as the heat resistance and the humidity resistance were degraded considerably.

It is believed that when a plurality of the capacitor elements 1 are disposed on the cathode terminal 2 at such an interval as to not change the outer dimensions as in the solid electrolytic capacitor X3 of Comparative Example 1, the resin is not easily brought in between the capacitor elements 1, although the cathode layers 6 and the cathode lead-out layers 7 in the facing side surfaces of the capacitor elements 1 are not compressed, unlike Comparative Example 2. Therefore, the initial electrical characteristics degrade because of the adverse effects originating from the pressure of the resin at the initial stage of injection molding. It is also believed that when a portion unfilled by the resin is left between the capacitor elements 1, conductivity of the cathode layers 6 and the cathode lead-out layers 7 deteriorates over time because of the adverse effects caused by the air that has remained inside or the air and moisture infiltrating from the interface between the housing 9 and the terminals.

In contrast, it is believed that in the solid electrolytic capacitor B of the above Example, the ridged portions 10 of the cathode terminal 2 provided between the capacitor elements 1 can prevent misalignment of the capacitor elements 1 caused by the pressure of the resin in the injection molding, ensuring the connection between the capacitor elements 1 and the cathode terminal 2. Moreover, since the interval between the capacitor elements 1 can be maintained, the resin tends to easily fill in between the capacitor elements 1 at the initial stage of injection molding. The filled resin serves as cushioning, preventing the cathode layers 6 and the cathode lead-out layers 7 in the facing side surfaces of the capacitor elements 1 from being compressed. It is believed that deterioration in the capacitor performance such as ESR and LC was thus prevented.

In addition, it is believed that the degradation in electrical characteristics caused by the adverse effects originating from the air or moisture infiltrating from the interface between the housing 9 and the terminals was prevented because the resin had filled in between the capacitor elements 1.

Fourth Embodiments

EXAMPLE

Hereinbelow, an example of the fourth embodiment according to the present invention is described with reference to the drawings. It should be noted that the solid electrolytic capacitor according to the fourth embodiment of the present invention is referred to as a solid electrolytic capacitor D, and the solid electrolytic capacitors of Comparative Examples 1 and 2 in the fourth embodiment are referred to as solid electrolytic capacitors X4 and Y4, respectively.

Figure 10:
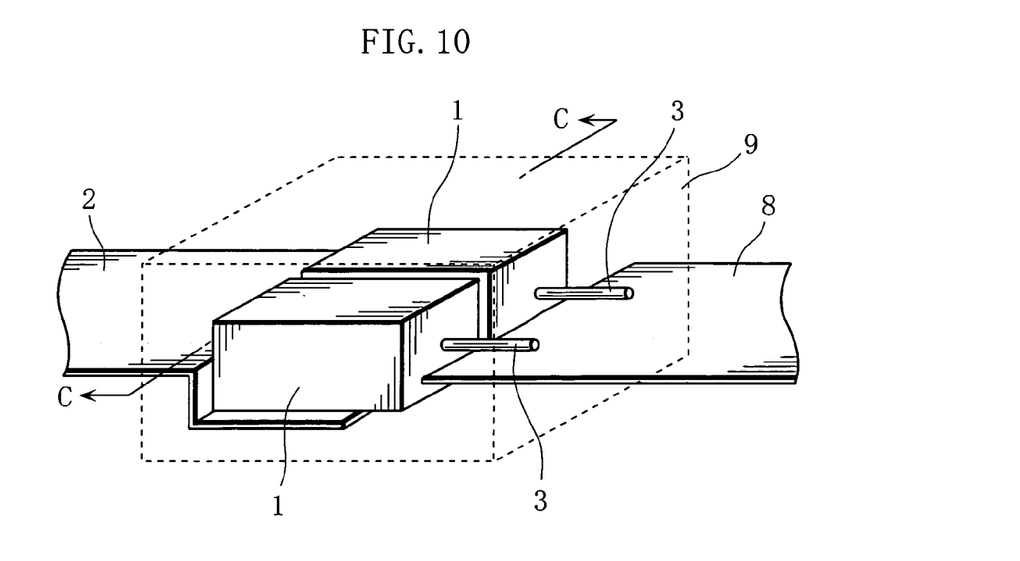
FIG. 10 is a perspective view illustrating a solid electrolytic capacitor of an example according to a fourth embodiment, before the anode terminal and the cathode terminal are bent.
Figure 11:
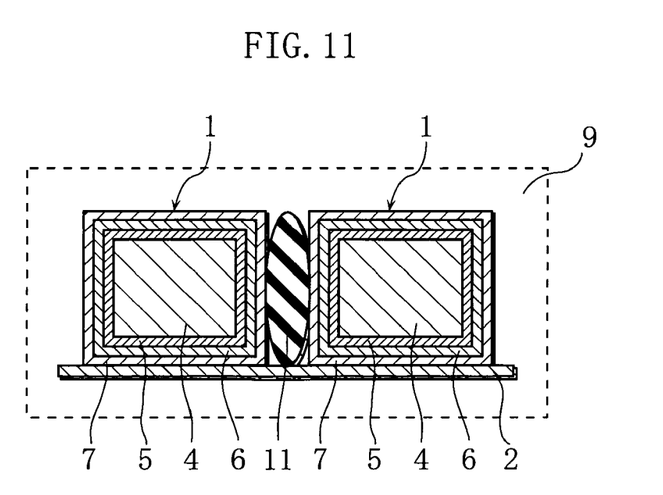
FIG. 11 is a vertical cross-sectional view taken along line C—C in FIG. 10.
Figure 12:
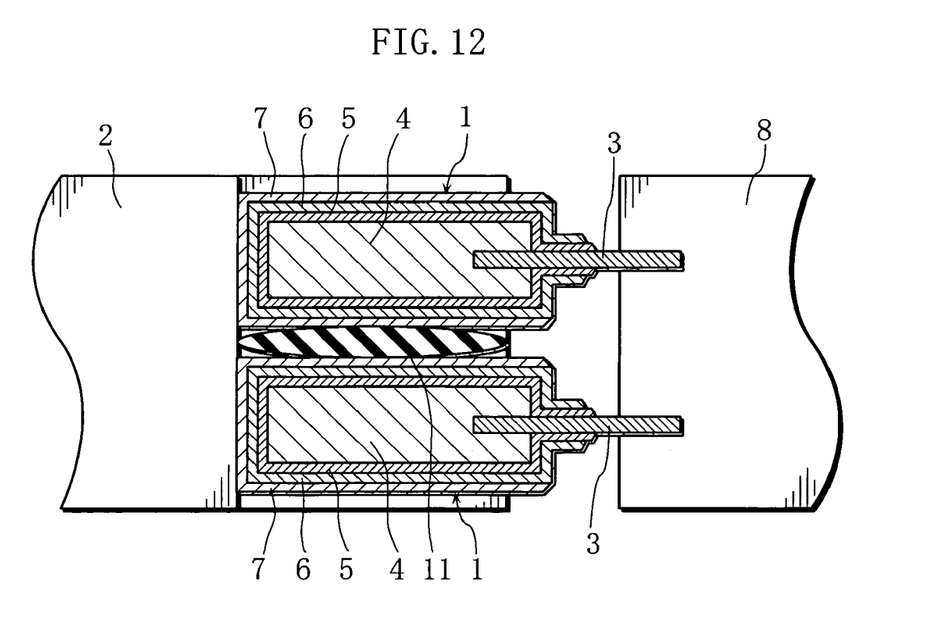
FIG. 12 is a partial horizontal cross-sectional view illustrating the example of the fourth embodiment, before the housing is formed.

FIG. 10 is a perspective view illustrating the solid electrolytic capacitor D of the present example, before the anode terminal 2 and the cathode terminal 8 are bent. As illustrated in this figure, the solid electrolytic capacitor D of the present example differs from the above-described solid electrolytic capacitors A, B, and C of the foregoing first to third embodiments in the respect that no anode resin-filling opening 8a is provided between the connecting portions of the anode terminal 8 to which the anode lead members 3 are connected. FIG. 11 is a vertical cross-sectional view taken along line C—C in FIG. 10. As illustrated in the figure, the solid electrolytic capacitor D of the present example differs from the above-described solid electrolytic capacitors A, B, and C of the foregoing first to third embodiments in the respect that no cathode resin-filling opening 2a is provided at a middle portion of a width W of the cathode terminal 2 that is in the lower step portion of the cathode terminal 2 on which the capacitor elements 1 were supposed to be mounted. FIG. 12 illustrates its top view, before the housing 9 is formed.

The solid electrolytic capacitor D in the present example includes a cushioning member 11 disposed in at least one space between the capacitor elements 1. Examples of the material for the cushioning member 11 may include, but is not particularly limited to, synthetic resins, rubber, paper, and fabric. It is preferable that the cushioning member 11 be made of a material having a thermal expansion coefficient less than that of the resin used for the housing 9.

The solid electrolytic capacitor D of the present example was fabricated in the following manner.

The capacitor elements 1 were prepared in the same manner as in the Example of the first embodiment.

Next, the cathode terminal 2 was bent in a step-like shape. Then, a conductive adhesive was applied on the portions of the cathode terminal 2 on which the capacitor elements 1 are supposed to be disposed, and two capacitor elements 1 were mounted thereon at a predetermined interval (0.3 mm, for example), followed by connecting the cathode terminal 2 to the cathode lead-out layers 7. Then, a silicone rubber was provided between the capacitor elements 1 as the cushioning member 11. In addition, anode lead members 3 were attached to the anode terminal 8 by resistance welding. Thus, a solid electrolytic capacitor D having a rectangular parallelepipedal outer shape (7.3 mm×4.3 mm×2.8 mm) was completed, which was in other respects similar to the Example of the first embodiment.

COMPARATIVE EXAMPLE 1

The solid electrolytic capacitor X4 of Comparative Example 1 was fabricated and the housing 9 was formed in the same conditions as in the above Example of the fourth embodiment except that, as illustrated in FIG. 4, the cathode terminal 2 was provided with no cushioning member 11 and that the two capacitor elements 1 were disposed side by side on the cathode terminal 2 at the same interval (0.3 mm) as that in the above Example. Here, the resin was cured without having been filled in between the capacitor elements 1. Then, the solid electrolytic capacitor X4 having the same outer dimensions as the capacitor D was fabricated through the same subsequent steps as in the Example of the fourth embodiment.

COMPARATIVE EXAMPLE 2

The solid electrolytic capacitor Y4 of Comparative Example 2 was fabricated so as to have the same outer dimensions and in the same manner as in the Example of the fourth embodiment, except that, as illustrated in FIG. 5, the two capacitor elements 1 were disposed side by side without providing a gap therebetween Table 7 below summarizes the results of an initial characteristics measurement and a subsequent high-temperature load test, which were conducted using samples of the Example, the Comparative Example 1, and the Comparative Example 2 of the fourth embodiment under the same conditions as in the Example, the Comparative Example 1, and the Comparative Example 2 of the foregoing first embodiment.

Likewise, Table 4 below summarizes the results of the initial characteristics measurement and a subsequent humidity no-load test, which were conducted using samples of the Example, the Comparative Example 1, and the Comparative Example 2 of the fourth embodiment under the same conditions as in the Example, the Comparative Example 1, and the Comparative Example 2 of the foregoing first embodiment.

TABLE 7

| | Initial characteristics | | After high-temperature load test (5000 hrs.) | |
| --- | --- | --- | --- | --- |
| | ESR (mΩ) | LC (μA) | ESR (mΩ) | LC (μA) |
| D | 7.3 | 10.7 | 7.4 | 8.0 |
| X4 | 7.7 | 11.4 | 10.3 | 11 |
| Y4 | 8.9 | 25.1 | 18.8 | 16.2 |

TABLE 8

| | Initial characteristics | | After humidity no-load test (5000 hrs.) | |
|---|---|---|---|---|
| | ESR (mΩ) | LC (μA) | ESR (mΩ) | LC (μA) |
| D | 7.3 | 10.7 | 7.9 | 4.4 |
| X4 | 7.7 | 11.4 | 9.1 | 7.9 |
| Y4 | 8.9 | 25.1 | 10.8 | 20.0 |

As seen in Tables 7 and 8, the solid electrolytic capacitor D of the present example exhibited improved initial ESR and LC characteristics over the solid electrolytic capacitors X4 and Y4 of Comparative Examples 1 and 2. It is believed that the solid electrolytic capacitor A of the present example showed improved electrical characteristics over the solid electrolytic capacitor Y4 of Comparative Example 2 for the following reason. The cushioning member 11 serves the purpose of cushioning, preventing the cathode layers 6 and the cathode lead-out layers 7 in the facing side surfaces of the capacitor elements 1 from being compressed. Thus, deterioration in the capacitor performance such as ESR and LC was prevented.

What is particularly remarkable is that the improvement effect in the electrical characteristics was obtained, despite the fact that the gap between the capacitor elements 1 was the same in both the present example and Comparative Example 1 (0.3 mm in both) and thus there was no adverse effect in their outer dimensions.

It is believed that when a plurality of the capacitor elements 1 are disposed on the cathode terminal 2 at such an interval as to not change the outer dimensions, the resin is not brought in between the capacitor elements 1, although the cathode layers 6 and the cathode lead-out layers 7 in the facing side surfaces of the capacitor elements 1 are not compressed, unlike Comparative Example 2. Therefore, the initial electrical characteristics degrade because of the adverse effects originating from the pressure of the resin at the initial stage of the injection molding. It is also believed that when a portion unfilled by the resin remains between the capacitor elements 1, conductivity of the cathode layers 6 and the cathode lead-out layers 7 deteriorates over time because of the adverse effects originating from the air that has remained therein. It is also believed that the adverse effects originating from moisture under a high-humidity environment become greater in the portion unfilled by the resin, and humidity resistance degrades.

In contrast, the solid electrolytic capacitor D of the present example was free from the just-described problems, and thus was able to obtain good electrical characteristics in both the initial characteristics and in the characteristics after the high-temperature load test and the humidity test no-load test.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A solid electrolytic capacitor comprising:
a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein
the capacitor elements are mounted on the cathode terminal at an interval, the cathode terminal has a cathode resin-filling opening provided between the capacitor elements, and the resin is filled between the capacitor elements and in the cathode resin-filling opening.

2. The solid electrolytic capacitor according to claim 1, wherein the anode terminal has an anode resin-filling opening provided between connecting portions thereof to which the anode lead parts are connected, and the anode resin-filling opening is filled with the resin.

3. A solid electrolytic capacitor comprising:
a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein
the capacitor elements are mounted side by side on the cathode terminal at an interval, a distance a between the capacitor elements and a distance b from outside surfaces of the outermost capacitor elements of the capacitor elements to an outside surface of the housing is substantially equal, and the resin is filled between the capacitor elements.

4. The solid electrolytic capacitor according to claim 3, wherein a distance c from upper outer surfaces of the capacitor elements that are opposite to surfaces mounted on the cathode terminal to an upper outer surface of the housing is substantially equal to the distance a and the distance b.

5. The solid electrolytic capacitor according to claim 4, wherein the cathode terminal has a cathode resin-filling opening provided between the capacitor elements, and the resin is filled between the capacitor elements and in the cathode resin-filling opening.

6. The solid electrolytic capacitor according to claim 5, wherein a distance d from lower outer surfaces of the capacitor elements mounted on the cathode terminal to a lower outer surface of the housing is substantially equal to the distance a, the distance b, and the distance c.

7. The solid electrolytic capacitor according to claim 6, wherein all the plurality of the capacitor elements have a substantially rectangular parallelepipedal outer shape.

8. The solid electrolytic capacitor according to claim 3, wherein the cathode terminal has a cathode resin-filling opening provided between the capacitor elements, and the resin is filled between the capacitor elements and in the cathode resin-filling opening.

9. The solid electrolytic capacitor according to claim 8, wherein a distance d from lower outer surfaces of the capacitor elements mounted on the cathode terminal to a lower outer surface of the housing is substantially equal to the distance a, the distance b, and the distance c.

10. The solid electrolytic capacitor according to claim 9, wherein all the plurality of the capacitor elements have a substantially rectangular parallelepipedal outer shape.

11. A solid electrolytic capacitor comprising:

a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein the capacitor elements are mounted on the cathode terminal at an interval; and the cathode terminal has ridged portions between the capacitor elements.

12. The solid electrolytic capacitor according to claim 11, wherein the cathode terminal has a cathode resin-filling opening provided between the capacitor elements and formed by providing the ridged portions; and the resin is filled between the capacitor element and in the cathode resin-filling opening.

13. The solid electrolytic capacitor according to claim 12, wherein the capacitor elements are disposed to form an array on the cathode terminal; and the cathode terminal further has ridged portions at opposite ends of the array of the capacitor elements. elements and in the cathode resin-filling opening.

14. The solid electrolytic capacitor according to claim 11, wherein the capacitor elements are disposed to form an array on the cathode terminal; and the cathode terminal further has ridged portions at opposite ends of the array of the capacitor elements.

15. A solid electrolytic capacitor comprising:

a plurality of capacitor elements each having a dielectric film, a cathode layer, and a cathode lead-out layer formed in succession on a surface of an anode body having an anode lead part, each anode lead part of the capacitor elements connected to an anode terminal, each cathode lead-out layer of the capacitor elements connected to a cathode terminal, and the plurality of capacitor elements covered by a housing made of resin, wherein the capacitor elements are mounted on the cathode terminal side by side at an interval; and a cushioning member is provided between the capacitor elements.

16. The solid electrolytic capacitor according to claim 15, wherein the cushioning member is made of a material having a thermal expansion coefficient less than that of the resin.

* * * * *